United States Patent
Gao et al.

(10) Patent No.: US 8,649,784 B2
(45) Date of Patent: Feb. 11, 2014

(54) SYSTEM AND METHOD FOR REMOTE HOUSEHOLD APPLIANCE CONTROL BASED ON MOBILE COMMUNICATION NETWORK

(75) Inventors: Lei Gao, Shenzhen (CN); Yonghua Luo, Shenzhen (CN); Jing Tang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/634,293

(22) PCT Filed: Aug. 24, 2010

(86) PCT No.: PCT/CN2010/076297
§ 371 (c)(1),
(2), (4) Date: Sep. 12, 2012

(87) PCT Pub. No.: WO2011/150596
PCT Pub. Date: Dec. 8, 2011

(65) Prior Publication Data
US 2013/0065579 A1  Mar. 14, 2013

(30) Foreign Application Priority Data
Jun. 4, 2010 (CN) .......................... 2010 1 0194415

(51) Int. Cl.
*H04W 4/14* (2009.01)
(52) U.S. Cl.
USPC .............................. 455/420; 455/406; 341/90
(58) Field of Classification Search
USPC ...................... 455/420, 226.1, 226.2, 522, 69; 709/223, 224
See application file for complete search history.

(56) References Cited

U.S. PATENT DOCUMENTS

2006/0235958 A1* 10/2006 Motoyama .................... 709/223

FOREIGN PATENT DOCUMENTS

| CN | 1176535 C | 11/2004 |
|----|-----------|---------|
| CN | 1759428 A | 4/2006 |
| CN | 101141336 A | 3/2008 |
| CN | 101436972 A | 5/2009 |

OTHER PUBLICATIONS

International Search Report for PCT/CN2010/076297 dated Oct. 2, 2010.

* cited by examiner

*Primary Examiner* — Phuoc H Doan
(74) *Attorney, Agent, or Firm* — Ling Wu; Stephen Yang; Ling and Yang Intellectual Property

(57) ABSTRACT

A system and a method for remote household appliance control based on a mobile communication network are provided. The system includes: a remote control access device and a remote control executor. The method includes: saving a first corresponding relationship between an infrared code type and identification information of a corresponding controlled household appliance and an operation act; and after receiving an unstructured supplementary service data (USSD) session request from a mobile terminal, sending a locally stored USSD menu to the mobile terminal and starting a USSD session with the mobile terminal; after receiving a USSD session content related to performing an operation act on a household appliance from the mobile terminal, transmitting an infrared control signal according to the corresponding infrared code type searched out according to the first corresponding relationship. The remote control of household appliance is realized conveniently by combining USSD and infrared remote control technologies.

14 Claims, 2 Drawing Sheets

SYSTEM AND METHOD FOR REMOTE HOUSEHOLD APPLIANCE CONTROL BASED ON MOBILE COMMUNICATION NETWORK

TECHNICAL FIELD

A certain embodiment of the invention relates to a system for household appliance control, and in particular, to a system and method for remote household appliance control based on a mobile communication network.

BACKGROUND ART

Recently, with the improvement of the standard of living of people, a large number of household appliances enter people's life. Meanwhile, with the rapid development of the mobile network, more and more people possess mobile phones. Thus, there arises a demand of controlling the household appliance using the mobile phone, and meanwhile it is required that the manner for remote interaction be simple, convenient and reliable.

The traditional system for remote household appliance control is mainly implemented by means of short message, but it has the following problems:

1) the security is poor;
2) the real-time performance is poor. The short message is transmitted in the store-and-forward manner, so the short message may be caused to fail to reach the destination household appliance in time due to reasons such as network congestion;
3) devices like GSM (Global System for Mobile Communications) MODEM need to be configured to perform control using the short message, so the costs are high;
4) the interaction is poor, and the user's experience is not friendly enough.

The Unstructured Supplementary Service Data (USSD) service is a novel interaction session data service that is real-time online and based on the global mobile communication network. This service is currently mature in technology, the data are transmitted using the signaling channel of the network based on the SIM (Subscriber Identity Module) card, and it is connection-oriented, so the reliability is high.

Both USSD and Short Messaging Service (SMS) are transmitted through the signaling channel of the network. The difference is that the short message adopts the store-and-forward manner, while USSD adopts the session-oriented manner. When a user visits a USSD service, the session path keeps connected until the session is over. In addition, since a transmission USSD string transparent path directly reaching an external service node through the HLR (Home Location Register) is provided, the user can also visit the service node outside the GSM network.

In a word, the USSD has the following features:

(1) Rapid. In the interactive application, since it only needs to establish the connection once, the delay for establishing the signaling connection for multiple times is reduced, the response time for one round is shorter than that of short message, and can be one seventh of the corresponding time for short message at most.

(2) Convenient. The user does not need to perform stepped menu selection, but directly enters the USSD command string.

(3) Support roaming. Each command of USSD passes through the HLR, so it operates in the same way as based on the USSD service when the user is roaming.

(4) Wide applicability. The USSD can be operated on all current mobile phones.

(5) Strong functions. Services can be provided in the session manner and information service menu manner.

3GPP (Third Generation Partnership Project) also includes the description on USSD, and both WCDMA (Wideband Code Division Multiple Access) and TD-SCDMA (Time Division-Synchronous Code Division Multiple Access) comply with the 3GPP standards, that is, the USSD technology can be widely supported in GSM, WCDMA and TD-SCDMA networks.

Infrared remote control is a remote control means that is used most widely at present, and this technology transmits a remote control instruction using near-infrared light with a wavelength of 0.76 um-1.5 um, and has a high transmission efficiency and high reliability.

SUMMARY OF THE INVENTION

By the system and method for remote household appliance control based on a mobile communication network provided in the certain embodiment of the invention, the security and real-time performance when performing remote household appliance control are improved.

In order to achieve the above purpose, the certain embodiment of the invention provides a system for remote household appliance control based on a mobile communication network, comprising: a remote control access device and a remote control executor;

the remote control access device is configured to send a menu request to the remote control executor after receiving an unstructured supplementary service data (USSD) session request sent by a mobile terminal; and forward a USSD menu sent from the remote control executor to the mobile terminal, and forward content of a USSD session implemented between the mobile terminal and the remote control executor;

the remote control executor is configured to send the locally stored USSD menu containing information about an operation act performed on a household appliance to the remote control access device after receiving the menu request; store a first corresponding relationship between an infrared code type and corresponding identification information of a controlled household appliance and the operation act; and transmit an infrared control signal according to the corresponding infrared code type searched out according to the first corresponding relationship after receiving the content of the USSD session related to performing the operation act on the household appliance sent from the mobile terminal.

Preferably, the above system has the following feature:

the remote control executor also stores a second corresponding relationship between number information of the mobile terminal and USSD menu information;

the menu request further carries the number information of the mobile terminal;

the remote control executor is configured to send the USSD menu corresponding to the number information of the mobile terminal to the remote control access device after receiving the menu request according to the second corresponding relationship.

Preferably, the above system has the following feature:

the remote control executor comprises: a control manager and at least one remote control controller;

the first corresponding relationship further comprises a corresponding relationship between identification information of the remote control controller and the infrared code type learned by the remote control controller;

the control manager stores the second corresponding relationship; the control manager is configured to, after receiving the infrared code type sent by the remote control controller, store the first corresponding relationship between the infrared code type and the identification information of the corresponding controlled household appliance and the operation act; transmit, after receiving the menu request, to the remote control access device the USSD menu which corresponds to the number information of the mobile terminal and is searched out according to the second corresponding relationship, and start to implement the USSD session with the mobile terminal through the remote control access device; and, transmit the corresponding infrared code type to the corresponding remote control controller according to the first corresponding relationship after receiving the content of the USSD session related to performing the operation act on the household appliance sent from the mobile terminal;

the remote control controller is configured to synchronize the learned infrared code type to the control manager; and transmit the infrared control signal according to the infrared code type sent to the remote control controller by the control manager.

Preferably, the above system has the following feature:

the session request further carries identification information of the remote control controller; the second corresponding relationship further comprises a corresponding relationship between the identification information of the remote control controller and the number information of the mobile terminal;

the menu request sent by the remote control access device to the remote control executor carries the identification information of the remote control controller;

the control manger is configured to judge whether the identification information of the remote control controller carried in the session request corresponds to the number information of the mobile terminal according to the second corresponding relationship, and if the identification information of the remote control controller corresponds to the number information of the mobile terminal, transmit to the remote control access device the USSD menu corresponding to the number information of the mobile terminal searched out according to the second corresponding relationship.

Preferably, the above system has the following feature:

the first corresponding relationship further comprises time information corresponding to performing the operation act on each controlled household appliance;

the control manager is further configured to, after receiving the content of the USSD session related to performing the operation act on the household appliance, judge whether a current time meets the time information corresponding to initiating the operation act on the household appliance involved in the content of the session according to the first corresponding relationship, and if the current time meets the time information corresponding to initiating the operation act on the household appliance involved in the content of the session, send the corresponding infrared code type to the corresponding remote control controller. The certain embodiment of the invention further provides a method for remote household appliance control based on a mobile communication network, comprising the following steps of:

saving a first corresponding relationship between an infrared code type and identification information of a corresponding controlled household appliance and an operation act; and after receiving an unstructured supplementary service data (USSD) session request from a mobile terminal, sending a locally stored USSD menu to the mobile terminal and starting a USSD session with the mobile terminal; after receiving content of the USSD session related to performing an operation act on a household appliance from the mobile terminal, transmitting an infrared control signal according to the corresponding infrared code type searched out according to the first corresponding relationship.

Preferably, the above system has the following feature:

a second corresponding relationship between number information of the mobile terminal and USSD menu information is further configured;

the step of sending the locally stored USSD menu to the mobile terminal after receiving the USSD session request from the mobile terminal comprises: sending the USSD menu corresponding to the number information of the mobile terminal to the mobile terminal according to the second corresponding relationship after receiving the menu request.

Preferably, the above system has the following feature:

the first corresponding relationship further comprises time information corresponding to performing the operation act on each controlled household appliance;

the step of transmitting an infrared control signal according to the corresponding infrared code type searched out according to the first corresponding relationship after receiving content of the USSD session related to performing an operation act on a household appliance from the mobile terminal comprises: after receiving the content of the USSD session related to performing the operation act on the household appliance, judging whether a current time meets the time information corresponding to initiating the operation act on the household appliance involved in the content of the session according to the first corresponding relationship, and if the current time meets the time information corresponding to initiating the operation act on the household appliance involved in the content of the session, sending the infrared control signal according to the corresponding infrared code type.

Preferably, the above system has the following feature:

when there are a plurality of remote control controllers for transmitting the infrared control signal, the second corresponding relationship further comprises a corresponding relationship between the identification information of the remote control controller and the number information of the mobile terminal;

the USSD session request sent by the mobile terminal further carries identification information of the remote control controller;

the step of sending the locally stored USSD menu to the mobile terminal after receiving the USSD session request from the mobile terminal comprises: after receiving the session request, judging whether the identification information of the remote control controller carried in the session request corresponds to the number information of the mobile terminal according to the second corresponding relationship, and if the identification information of the remote control controller corresponds to the number information of the mobile terminal, sending to the mobile terminal the USSD menu corresponding to the number information of the mobile terminal.

Preferably, the above system has the following feature:

when there are a plurality of remote control controllers for transmitting the infrared control signal, the first corresponding relationship further comprises a corresponding relationship between identification information of the remote control controller and the infrared code type learned thereby;

the step of transmitting an infrared control signal according to the corresponding infrared code type searched out according to the first corresponding relationship after receiving content of the USSD session related to performing an operation act on a household appliance comprises: transmitting to the corresponding remote control controller the corresponding infrared code type searched out according to the first corresponding relationship after receiving the content of the USSD session, and the remote control controller transmitting the infrared control signal according to the received infrared code type.

Compared with the related art, the certain embodiment of the invention combines the USSD technology and the infrared remote control technology using the present mobile communication network to realize the remote control of the household appliance conveniently. In addition, the certain embodiment of the invention also has the following advantages:

1) the control manager supports multiple remote control controller access code configuration, i.e., a plurality of remote control controllers can be supported simultaneously, thus saving structuring cost;

2) multi-user use can be realized by only remotely controlling one access device, and it does not need to configure a mobile communication module for each remote control controller, thus greatly saving system implementation cost;

3) the remote control controller supports learning infrared code type and synchronously recording the infrared code type to the control manager, multi-controlled household appliance flexible deployment can be supported without the need of configuring multiple learning areas to learn the infrared code type, and rapid deployment can be achieved after addition of household appliances;

4) the control manager supports allowing control of user configuration, and the security is high;

5) the control manager supports control of effective control time segment;

6) the control manager supports remote control controller USSD menu configuration, which is more flexible and convenient.

PREFERRED EMBODIMENTS OF THE INVENTION

In order to achieve the above purpose, certain embodiment of the invention provides a system for remote household appliance control based on a mobile communication network, comprising: a remote control access device and a remote control executor.

The remote control access device is configured to send a menu request to the remote control executor after receiving a USSD session request sent by a mobile terminal; and forward a USSD menu sent from the remote control executor to the mobile terminal, and forward content of a USSD session implemented between the mobile terminal and the remote control executor;

the remote control executor is configured to send the locally stored USSD menu containing information about an operation act performed on a household appliance to the remote control access device after receiving the menu request; store a first corresponding relationship between an infrared code type and corresponding identification information of a controlled household appliance and the operation act; and transmit an infrared control signal according to the corresponding infrared code type searched out according to the first corresponding relationship after receiving the content of the USSD session related to performing the operation act on the household appliance sent from the mobile terminal.

Figure 1:
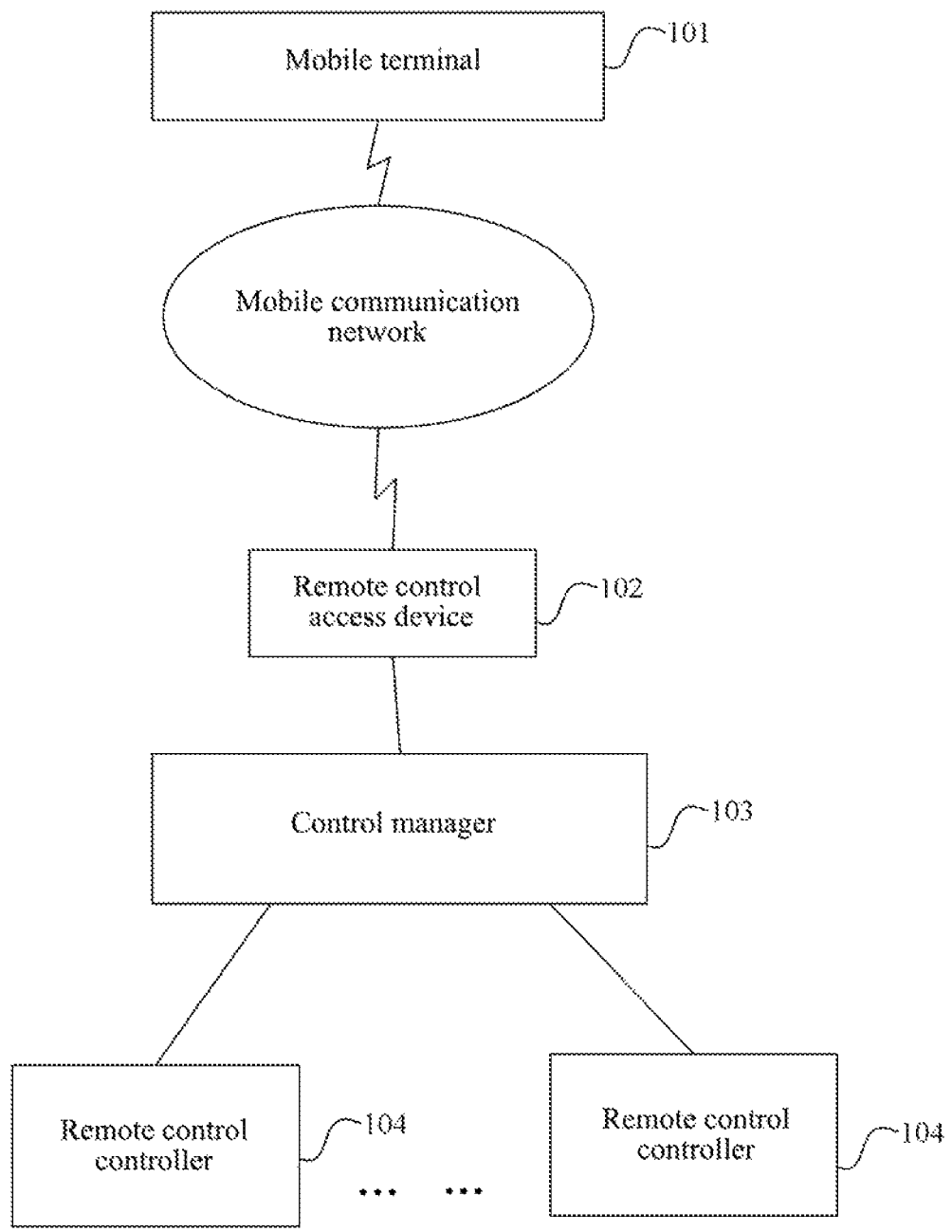
FIG. 1 illustrates the structure of the system for remote household appliance control according to an example of the certain embodiment of the invention.

In the specific implementation, the remote control executor may further comprise: a control manager and one or more remote control controllers. As shown in FIG. 1, the above system specifically comprises:

a remote access device 102, which is provided with a mobile communication module inside for accessing the existing mobile communication network, and interacts with the control manager 103 via the wired network; after receiving a USSD session request from the mobile terminal 101, sends to the control manager 103 a menu request carrying the number information of the above mobile terminal 101, and in addition, when the session request carries the identification information of the remote control controller 104, the remote control access device 102 may also add the identification information to the above menu request; it is further configured to, send the USSD menu sent from the control manager 103 to the above mobile terminal 101, and forward content of the USSD session implemented between the mobile terminal 101 and the control manager 103; wherein, the mobile communication network may be existing networks of different standards such as GSM, CDMA, WCDM and TD-SCDMA;

the control manager 103, one of this control manager may be provided in one cell, and is configured to store the first corresponding relationship between the identification information of each remote control controller, the number information of the mobile terminal and the USSD menu information, where the first corresponding relationship can be configured by the system administrator, or by the user using the human-computer interaction interface (such as WEB page) provided by the control manager; after receiving the above menu request, the control manager 103 is further configured to search for the USSD menu corresponding to the above number information of the mobile terminal according to the locally stored first corresponding relationship, and if the USSD menu can be found, send the corresponding USSD menu to the remote control access device, and start the USSD session with the above mobile terminal through the remote control access device. Or, the control manager 103 is further configured to, after receiving the menu request, judge whether the identification information of the remote control controller carried in the menu request corresponds to the number information of the mobile terminal according to the locally stored first corresponding relationship, and if yes, perform the subsequent USSD menu searching work; otherwise, not perform USSD menu searching but directly prompt the user of control failure; it is further configured to store a second corresponding relationship between the code type learned by the remote control controller and the identification information of the remote control controller, the corresponding operation object and the operation act, and transmit the corresponding infrared code type to the corresponding remote control controller 104 according to the second corresponding relationship after receiving the content of the USSD session related to performing the operation act on the household appliance initiated by the mobile terminal 101 that is forwarded by the remote control access device 102;

the remote control controller 104, which is provided with an infrared way transmitter supporting leaning function inside, and this remote control controller can execute the act of sending infrared ray, learn the infrared code type, and synchronize, through the wired network, the learned infrared code type to the control manager 103, which then records the second corresponding relationship between the code type and the corresponding operation object, operation act and the identification information of the remote control controller;

after receiving the code type sent by the control manager 103, transmit the infrared control signal according to the infrared code type; the remote control controller may be provided within the indoor access phone.

The basic concept of the method of the certain embodiment of the invention is: storing a first corresponding relationship between an infrared code type and corresponding identification information of a controlled household appliance and an operation act; and after receiving an unstructured supplementary service data (USSD) session request from a mobile terminal, sending a locally stored USSD menu to the mobile terminal and starting a USSD session with the mobile terminal; after receiving content of the USSD session related to performing an operation act to a household appliance from the mobile terminal, transmitting an infrared control signal according to the corresponding infrared code type searched out according to the first corresponding relationship.

In the example of the certain embodiment of the invention, the steps for implementing remote control are as follows:

Step one, the control system administrator logs in the wed page provided by the control manager, configures the related remote control controllers and the corresponding entrant information.

Step two, the user logs in the web page provided by the control manager, configures the USSD menu of his home remote control controller, the control manager records the corresponding relationship between the menu and the identification information of the remote control controller and the number information of the mobile terminal; in addition, the remote control controller, in conjunction with the infrared way transmitter with the learning function provided thereon, learns the infrared code types of the keys on the matched remote control of the household appliance, and sends the code types to the control manager to record the second corresponding relationship between the code type and the corresponding operation object configured by the user, operation act and the identification information of the remote control controller.

If the control manager provides a human-machine interaction interface, taking the WEB manner as an example, the user selects adding a household appliance (fore example the TV) after logging in, configures information of its operable act, such as switching on, switching off, etc., and a recording button is provided on the WEB during configuration, the user, after clicking the button, can learn the code type corresponding to performing the operation act on the household appliance through the remote control controller, and after completion of learning, the remote control controller sends the learned code type to the control manager, the control manager prompts through the WEB that code type learning is successful, after recording the corresponding relationship between the code type and the identification information of the remote control controller, the operation object and the operation act.

Step three, the controller initiates, through a mobile phone, a USSD session request to establish a connection with the remote control access device, and then the remote control access device forwards the number information of the above mobile phone (possibly along with the identification information of the remote control controller) to the control manager, the control manager searches the corresponding relationship configured thereon for the USSD menu corresponding to the number information, and if there is the USSD menu, the next step is executed; furthermore, if the control manager receives the identification information of the remote control controller, it firstly judges whether the identification information of the remote control controller corresponds to the number information of the mobile terminal according to the first corresponding relationship, and if yes, searches for the corresponding menu; otherwise, prompts the user of control failure, ending.

Step four, the control manager sends the corresponding USSD menu to the user's mobile phone through the remote control access device, and starts the USSD session with the mobile phone through the remote control access device.

Step five, the user interacts with the control manager through the USSD menu.

Step six, after completion of interaction, the control manager records this interaction to the system log, and meanwhile transmits the corresponding infrared code type searched out according to the above first corresponding relationship to the corresponding remote control controller according to the received content of the USSD session related to performing the operation act on the household appliance sent from the mobile terminal.

If the first corresponding relationship further comprises time information corresponding to performing the operation act on each controlled household appliance, then after receiving the content of the USSD session related to performing an operation act on a household appliance sent from the mobile terminal, whether a current time meets the time information corresponding to initiating the operation act on the household appliance involved in the content of the session is firstly judged, and if so, the corresponding infrared code type searched out according to the above first corresponding relationship is sent to the corresponding remote control controller; otherwise, the mobile terminal is prompted by the remote control access device that the household appliance cannot be controlled at this moment, ending.

Step seven, the remote control controller transmits the infrared signal according to the code type sent from the control manager to control the corresponding household appliance.

In order to make the example more specific, the USSD service access code of the remote control access device is set to be 125, the number of the remote control controller is 10, and the mobile phone number of the controller is 13966667724.

Figure 2:
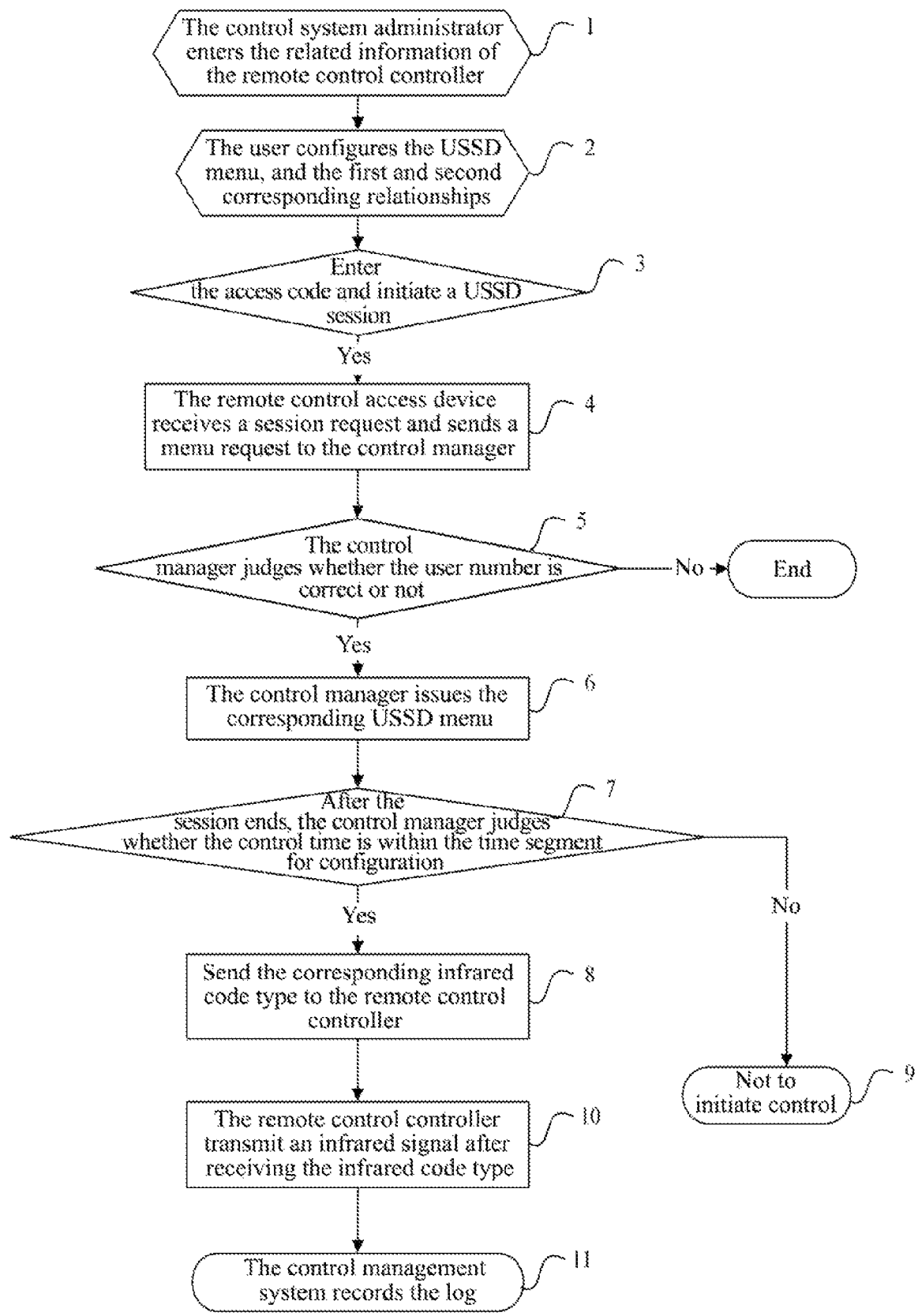
FIG. 2 is a flowchart of performing remote household appliance control according to an example of the certain embodiment of the invention.

As shown in FIG. 2, the controlling flow of the system for remote household appliance control based on a mobile communication network is as follows, where a TV switching-on control is taken as an example:

Step 1, the control system administrator logs in the control manager, enters the related information of the remote control controller, and allocates a number (i.e., the identification information of the remote control controller) and a user account that can configure the information of the remote control controller.

Step 2, the user logs in the control manager using the account allocated by the control system administrator, configures the USSD menu for the remote control controller, and the electrical appliance information displayed in the USSD menu configured by the user in the control manager is: TV, DVD, air conditioner, and the control acts configured for TV are: switch on, switch off, volume up, volume down.

Meanwhile, the remote control code type of the corresponding key on the TV remote control is learned through the infrared ray transmitter in the remote control controller and is recorded in the control manager when the control act is configured.

Then, the user configures the time segment when the control can be received, and the number of the bound mobile phone that can perform control is 13966667724.

Step 3, the controller initiates a USSD session request through the mobile phone, and the content of the message is

*125#10#, and the calling number is the 13966667724 that has been configured by the user in the control manager.

Step 4, the mobile communication module of the remote control access device sends the message to the control manager after receiving the request.

Step 5, the control manager judges whether the user number is correct or not; if it is correct, step 6 is executed, otherwise, end.

Step 6, the control manager acquires from the message that the remote control controller of number 10 is to be controlled, and the USSD first-level menu configured by the user is issued, and the controller's mobile phone displays the following similar menu:

Well to enter the household appliance control system, the number of the controller is 10

Please select the household appliance to be controlled
1. Television
2. DVD
3. Air conditioner 1 is selected in the user feedback, and the Television is to be controlled, and the control manager issues the second-level menu:

Well to enter the household appliance control system, the number of the controller is 10

Please select the control act:
1. Switch on
2. Switch off
3. Volume up
4. Volume down 1 is selected in the user feedback to perform switch-on control on the Television, and the session ends.

If the mobile phone number initiating the session is not the bound number configured in the control manager, the control manager will not issue the control menu, and can send a USSD message to the user's mobile phone to prompt that the number could not initiate the control.

Step 7, after the session ends, the control manager judges, according to the time when the user initiates the control, whether the time is within the time segment configured by the user during which the remote control controller can accept control, and if yes, step 8 is executed, otherwise, step 9 is executed.

Step 8, the control manager forwards to the remote control controller the infrared code type for controlling the switch-on act of the Television that is entered into the control manager by the user in advance; proceed to step 10.

Step 9, the control manager can send a USSD message to the user's mobile phone to prompt that the control cannot be initiated during this time segment; end.

Step 10, the remote control controller receives the infrared signal code type sent from the control manager, and triggers the infrared ray transmitter according to the code type to transmit an infrared control signal and performs switch-on control on the Television.

After step 10, there may be step 11: the control management system records the log.

A person having ordinary skill in the art can appreciate that all of part of the steps of the above method may be implemented by instructing related hardware with a program, which may be stored in a computer-readable medium, such as a read-only memory, a magnetic disk or an optical disk. Optionally, all of part of the steps of the above examples may also be implemented by using one or more integrated circuits. Correspondingly, each module/unit in the above examples may be implemented in the form of hardware, or in the form of software functional modules. The certain embodiment of the invention is not limited to any particular form of combination of hardware and software.

INDUSTRIAL APPLICABILITY

In the system and method for remote household appliance control based on a mobile communication network provided in the certain embodiment of the invention, the USSD technology and the infrared remote control technology are combined using the present mobile communication network to realize the remote control of the household appliance conveniently. In addition, the control manager in the certain embodiment of the invention supports multiple remote control controller access code configuration, and a plurality of remote control controllers can be supported simultaneously, thus saving structuring cost; multi-user use can be realized by only remotely controlling one access device, and it does not need to configure a mobile communication module for each remote control controller, thus greatly saving system implementation cost; the remote control controller supports learning infrared code type and synchronously recording the infrared code type to the control manager, multi-controlled household appliance flexible deployment can be support without the need of configuring multiple learning areas to learn the infrared code type, and rapid deployment can be achieved after addition of household appliances; the control manager supports allowing control of user configuration, and the security is high; the control manager supports control of effective control time segment; the control manager supports remote control controller USSD menu configuration, which is more flexible and convenient.

What is claimed is:

1. A system for remote household appliance control based on a mobile communication network, comprising: a remote control access device and a remote control executor;
    the remote control access device is configured to send a menu request to the remote control executor after receiving an unstructured supplementary service data (USSD) session request sent by a mobile terminal; and forward a USSD menu sent from the remote control executor to the mobile terminal, and forward content of a USSD session implemented between the mobile terminal and the remote control executor;
    the remote control executor is configured to send the locally stored USSD menu containing information about an operation act performed on a household appliance to the remote control access device after receiving the menu request; store a first corresponding relationship between an infrared code type and corresponding identification information of a controlled household appliance and the operation act; and transmit an infrared control signal according to the corresponding infrared code type searched out according to the first corresponding relationship after receiving the content of the USSD session related to performing the operation act on the household appliance sent from the mobile terminal.

2. The system according to claim 1, wherein,
    the remote control executor also stores a second corresponding relationship between number information of the mobile terminal and USSD menu information;
    the menu request further carries the number information of the mobile terminal;
    the remote control executor is configured to send the USSD menu corresponding to the number information of the mobile terminal to the remote control access device after receiving the menu request according to the second corresponding relationship.

3. The system according to claim 2, wherein,
the remote control executor comprises: a control manager and at least one remote control controller;
the first corresponding relationship further comprises a corresponding relationship between identification information of the remote control controller and the infrared code type learned by the remote control controller;
the control manager stores the second corresponding relationship; the control manager is configured to, after receiving the infrared code type sent by the remote control controller, store the first corresponding relationship between the infrared code type and the identification information of the corresponding controlled household appliance and the operation act; transmit, after receiving the menu request, to the remote control access device the USSD menu which corresponds to the number information of the mobile terminal and is searched out according to the second corresponding relationship, and start to implement the USSD session with the mobile terminal through the remote control access device; and, transmit the corresponding infrared code type to the corresponding remote control controller according to the first corresponding relationship after receiving the content of the USSD session related to performing the operation act on the household appliance sent from the mobile terminal;
the remote control controller is configured to synchronize the learned infrared code type to the control manager; and transmit the infrared control signal according to the infrared code type sent to the remote control controller by the control manager.

4. The system according to claim 3, wherein,
the session request further carries identification information of the remote control controller; the second corresponding relationship further comprises a corresponding relationship between the identification information of the remote control controller and the number information of the mobile terminal;
the menu request sent by the remote control access device to the remote control executor carries the identification information of the remote control controller;
the control manger is configured to judge whether the identification information of the remote control controller carried in the session request corresponds to the number information of the mobile terminal according to the second corresponding relationship, and if the identification information of the remote control controller corresponds to the number information of the mobile terminal, transmit to the remote control access device the USSD menu corresponding to the number information of the mobile terminal searched out according to the second corresponding relationship.

5. The system according to claim 4, wherein,
the first corresponding relationship further comprises time information corresponding to performing the operation act on each controlled household appliance;
the control manager is further configured to, after receiving the content of the USSD session related to performing the operation act on the household appliance, judge whether a current time meets the time information corresponding to initiating the operation act on the household appliance involved in the content of the session according to the first corresponding relationship, and if the current time meets the time information corresponding to initiating the operation act on the household appliance involved in the content of the session, send the corresponding infrared code type to the corresponding remote control controller.

6. The system according to claim 3, wherein,
the first corresponding relationship further comprises time information corresponding to performing the operation act on each controlled household appliance;
the control manager is further configured to, after receiving the content of the USSD session related to performing the operation act on the household appliance, judge whether a current time meets the time information corresponding to initiating the operation act on the household appliance involved in the content of the session according to the first corresponding relationship, and if the current time meets the time information corresponding to initiating the operation act on the household appliance involved in the content of the session, send the corresponding infrared code type to the corresponding remote control controller.

7. A method for remote household appliance control based on a mobile communication network, comprising the following steps of:
a remote control executor storing a first corresponding relationship between an infrared code type and identification information of a corresponding controlled household appliance and an operation act; and
the remote control executor, after receiving a menu request sent by a remote control access device in which an unstructured supplementary service data (USSD) session request is received from a mobile terminal, sending a locally stored USSD menu containing information about an operation act performed on a household appliance to the mobile terminal via the remote control access device, and starting a USSD session with the mobile terminal via the remote control access device;
the remote control executor, after receiving content of the USSD session related to performing an operation act on a household appliance sent from the mobile terminal, transmitting an infrared control signal according to the corresponding infrared code type searched out according to the first corresponding relationship.

8. The method according to claim 7, further comprising:
the remote control executor storing a second corresponding relationship between number information of the mobile terminal and USSD menu information;
the step of the remote control executor, after receiving a menu request sent by a remote control access device in which an unstructured supplementary service data (USSD) session request is received from a mobile terminal, sending a locally stored USSD menu containing information about operation acts performed on household appliances to the mobile terminal via the remote control access device comprises: the remote control executor, after receiving the menu request carrying the number information of the mobile terminal, sending the USSD menu corresponding to the number information of the mobile terminal to the mobile terminal via the remote control access device according to the second corresponding relationship.

9. The method according to claim 8, wherein, the remote control executor comprises: a control manager and at least one remote control controller; and
the second corresponding relationship further comprises a corresponding relationship between identification information of the remote control controller and the number information of the mobile terminal;
the USSD session request sent by the mobile terminal further carries the identification information of the remote control controller;

the step of the remote control executor, after receiving a menu request sent by a remote control access device in which an unstructured supplementary service data (USSD) session request is received from a mobile terminal, sending a locally stored USSD menu containing information about operation acts performed on household appliances to the mobile terminal comprises: the control manager, after receiving the menu request carrying the identification information of the remote control controller, judging whether the identification information of the remote control controller carried in the menu request corresponds to the number information of the mobile terminal according to the second corresponding relationship, and if the identification information of the remote control controller corresponds to the number information of the mobile terminal, sending to the mobile terminal the USSD menu corresponding to the number information of the mobile terminal searched out according to the second corresponding relationship via the remote control access device.

10. The method according to claim 9, wherein, the remote control executor comprises: a control manager and at least one remote control controller; and the first corresponding relationship further comprises a corresponding relationship between identification information of the remote control controller and the infrared code type learned the remote control controller;

the step of the remote control executor, after receiving content of the USSD session related to performing an operation act on a household appliance sent from the mobile terminal, transmitting an infrared control signal according to the corresponding infrared code type searched out according to the first corresponding relationship comprises: the control manager transmitting to the corresponding remote control controller the corresponding infrared code type searched out according to the first corresponding relationship after receiving the content of the USSD session, and the remote control controller transmitting the infrared control signal according to the received infrared code type.

11. The method according to claim 8, wherein, the remote control executor comprises: a control manager and at least one remote control controller; and the first corresponding relationship further comprises a corresponding relationship between identification information of the remote control controller and the infrared code type thereby the remote control controller;

the step of the remote control executor, after receiving content of the USSD session related to performing an operation act on a household appliance sent from the mobile terminal, transmitting an infrared control signal according to the corresponding infrared code type searched out according to the first corresponding relationship comprises: the control manager transmitting to the corresponding remote control controller the corresponding infrared code type searched out according to the first corresponding relationship after receiving the content of the USSD session, and the remote control controller transmitting the infrared control signal according to the received infrared code type.

12. The method according to claim 7, wherein, the remote control executor comprises: a control manager and at least one remote control controller; and the first corresponding relationship further comprises time information corresponding to performing the operation act on each controlled household appliance;

the step of the remote control executor, after receiving content of the USSD session related to performing an operation act on a household appliance sent from the mobile terminal, transmitting an infrared control signal according to the corresponding infrared code type searched out according to the first corresponding relationship comprises:

the control manager, after receiving the content of the USSD session related to performing the operation act on the household appliance, judging whether a current time meets the time information corresponding to initiating the operation act on the household appliance involved in the content of the session according to the first corresponding relationship, and if the current time meets the time information corresponding to initiating the operation act on the household appliance involved in the content of the session, sending the corresponding infrared code type to the corresponding remote control controller.

13. The method according to claim 12, wherein, the remote control executor comprises: a control manager and at least one remote control controller; and the first corresponding relationship further comprises a corresponding relationship between identification information of the remote control controller and the infrared code type learned by the remote control controller;

the step of the remote control executor, after receiving content of the USSD session related to performing an operation act on a household appliance sent from the mobile terminal, transmitting an infrared control signal according to the corresponding infrared code type searched out according to the first corresponding relationship comprises: the control manager transmitting to the corresponding remote control controller the corresponding infrared code type searched out according to the first corresponding relationship after receiving the content of the USSD session, and the remote control controller transmitting the infrared control signal according to the received infrared code type.

14. The method according to claim 7, wherein, the remote control executor comprises: a control manager and at least one remote control controller; and the first corresponding relationship further comprises a corresponding relationship between identification information of the remote control controller and the infrared code type learned the remote control controller;

the step of the remote control executor, after receiving content of the USSD session related to performing an operation act on a household appliance sent from the mobile terminal, transmitting an infrared control signal according to the corresponding infrared code type searched out according to the first corresponding relationship comprises: the control manager transmitting to the corresponding remote control controller the corresponding infrared code type searched out according to the first corresponding relationship after receiving the content of the USSD session, and the remote control controller transmitting the infrared control signal according to the received infrared code type.

* * * * *